United States Patent [19]

Mizumoto

[11] Patent Number: 4,730,096

[45] Date of Patent: Mar. 8, 1988

[54] WELDING MONITORING APPARATUS

[75] Inventor: Morihide Mizumoto, Hachioji, Japan

[73] Assignee: Olympus Optical Co., Ltd., Tokyo, Japan

[21] Appl. No.: 26,333

[22] Filed: Mar. 16, 1987

[30] Foreign Application Priority Data

Mar. 19, 1986 [JP] Japan .................. 61-062686

[51] Int. Cl.⁴ .............................................. B23K 9/32
[52] U.S. Cl. ................. 219/130.01; 219/136; 219/147; 350/96.25; 350/362
[58] Field of Search .................. 219/130.01, 147, 136; 350/96.24, 96.25, 266, 362, 363

[56] References Cited

U.S. PATENT DOCUMENTS

| 3,666,949 | 5/1972 | DeFalco et al. | 350/96.24 |
| 4,039,803 | 8/1977 | Harsch | 219/147 |
| 4,153,333 | 5/1979 | Harada et al. | 350/96.25 |
| 4,225,771 | 9/1980 | Justice et al. | 219/137 R |
| 4,450,339 | 5/1984 | Corby, Jr. | 219/130.01 |
| 4,666,245 | 5/1987 | Pointer | 350/96.24 |

FOREIGN PATENT DOCUMENTS

| 3339182 | 4/1985 | Fed. Rep. of Germany . |
| 3613950 | 11/1986 | Fed. Rep. of Germany ... 350/96.25 |
| 53-142528 | 10/1978 | Japan . |
| 57-11755 | 6/1982 | Japan . |
| 57-202189 | 12/1982 | Japan . |

Primary Examiner—Clifford C. Shaw
Attorney, Agent, or Firm—Armstrong, Nikaido, Marmelstein & Kubovcik

[57] ABSTRACT

An apparatus for monitoring the welding state or the like of a welding part luminous at a high luminance wherein a light attenuating device is arranged near at least one end surface of an image guide arranged at one end in the focal plane of an image forming objective and transmitting an optical image to the other end side so that even an image having a high luminance part may be monitored without glaring.

21 Claims, 21 Drawing Figures

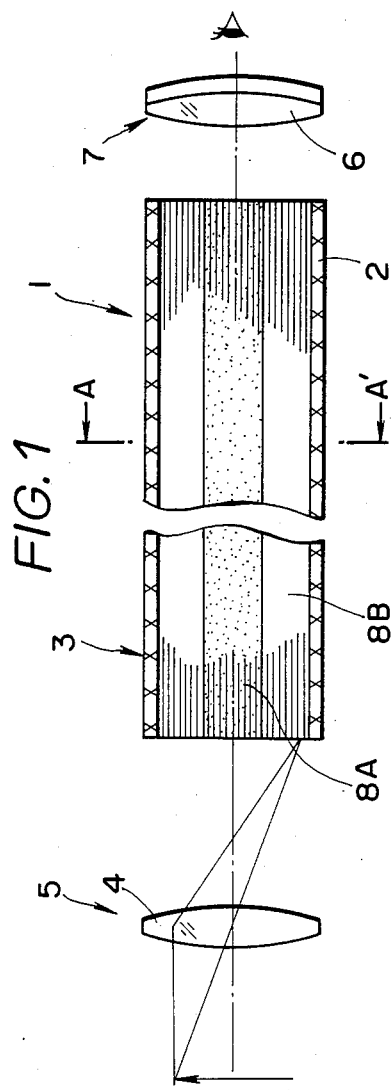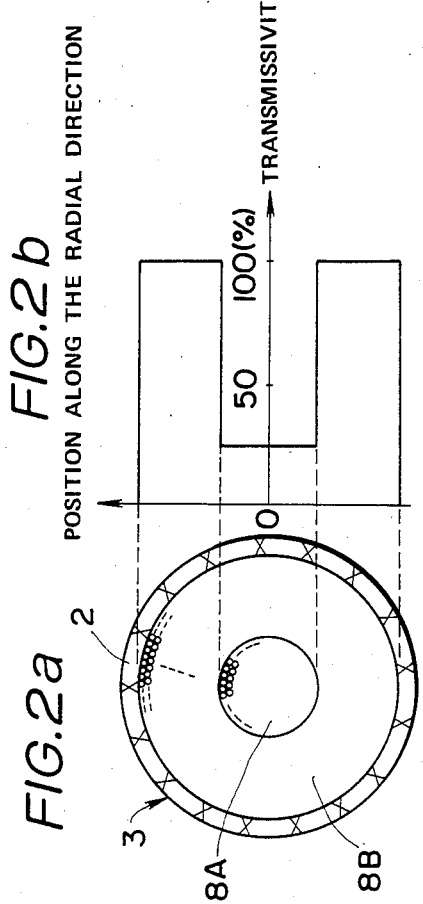

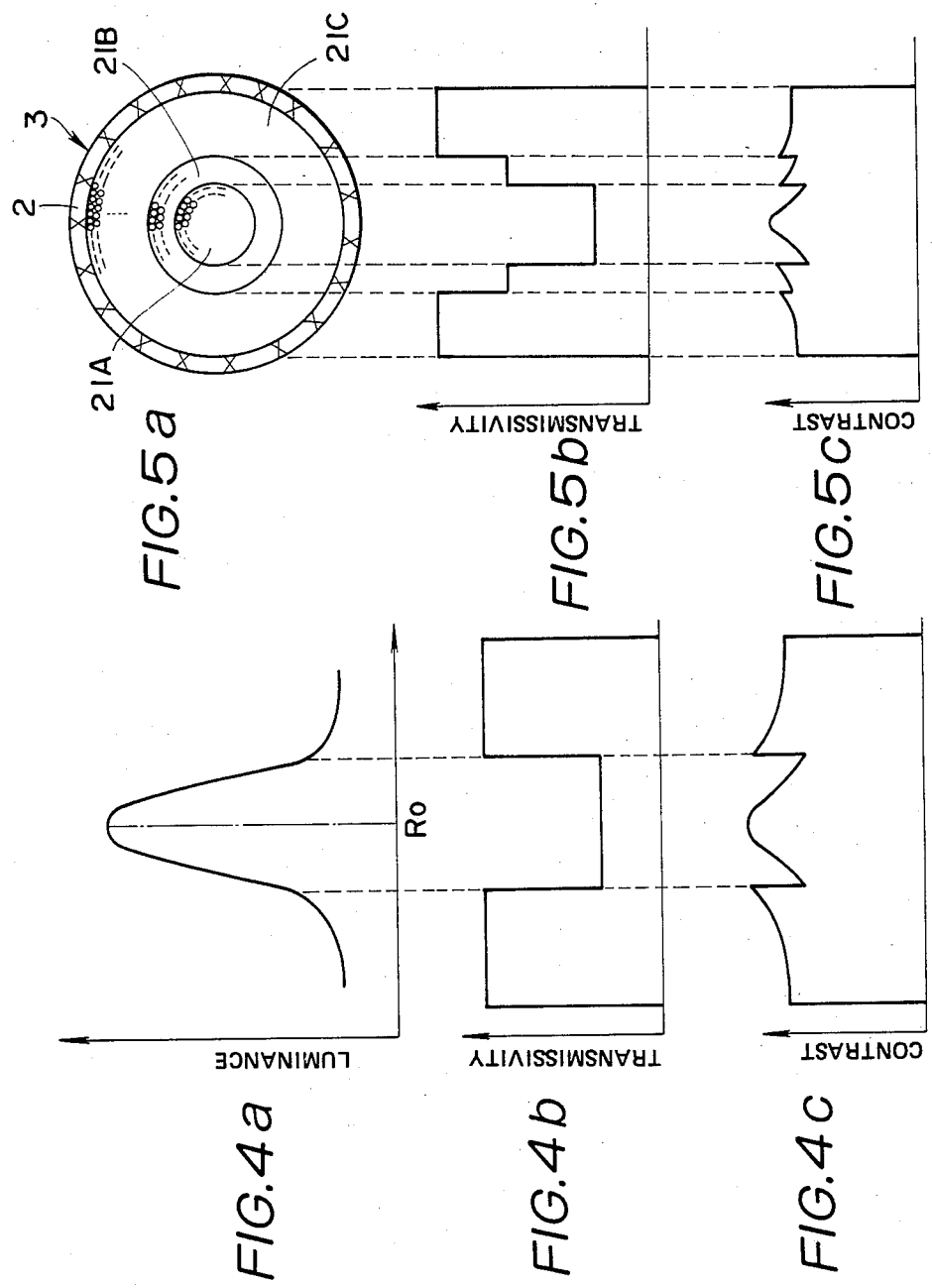

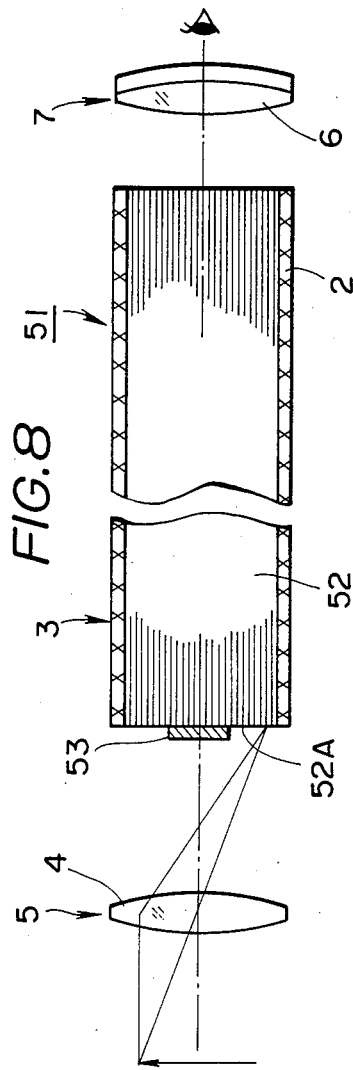
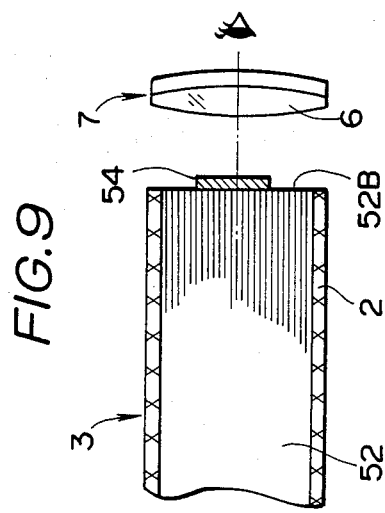

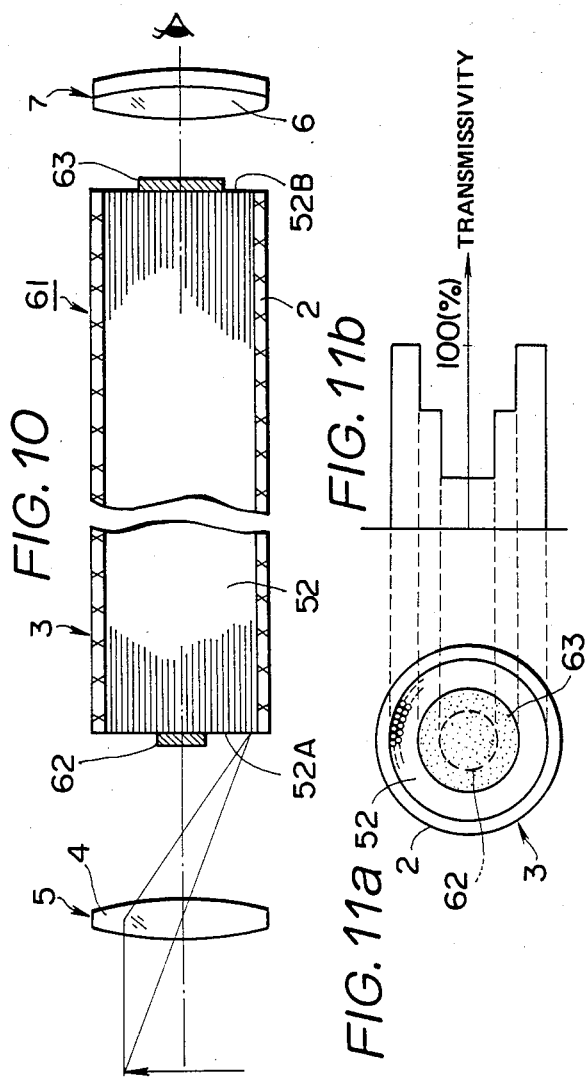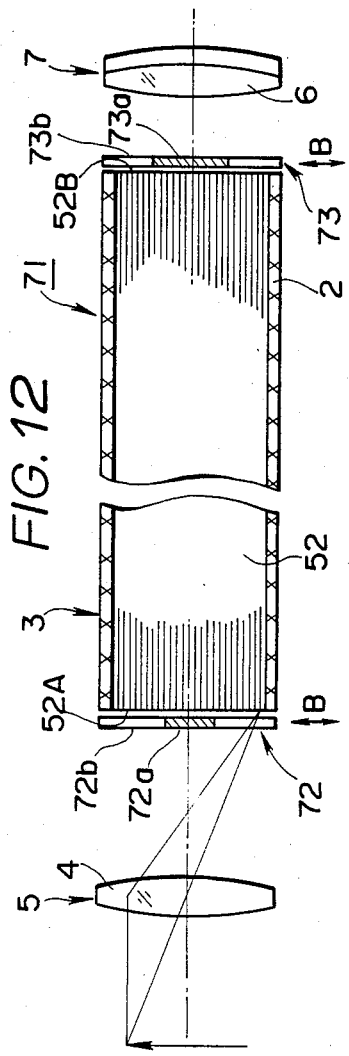

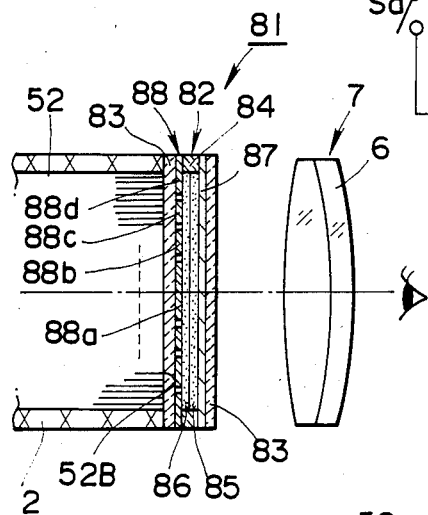
FIG. 13
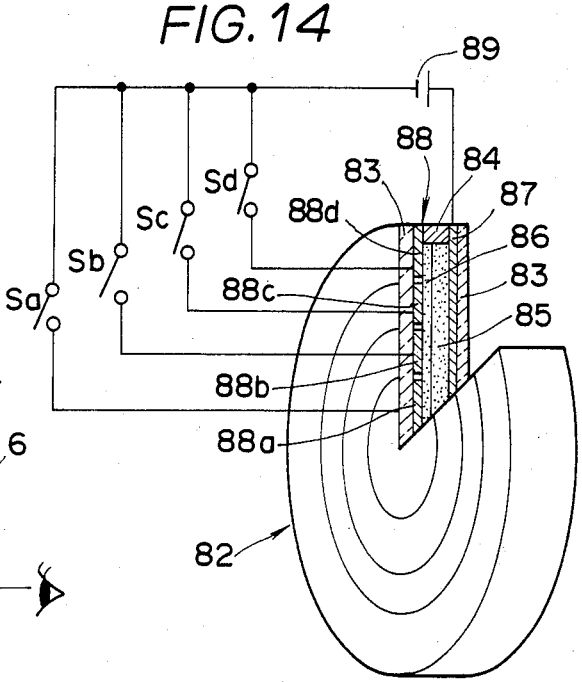
FIG. 14
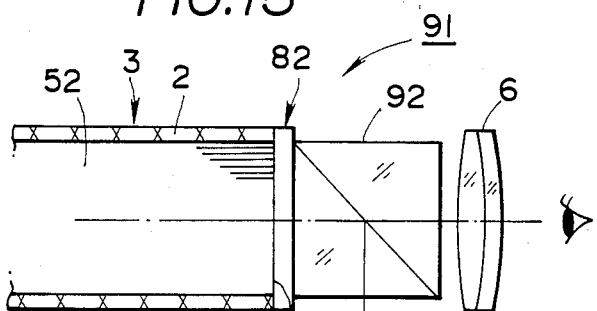
FIG. 15
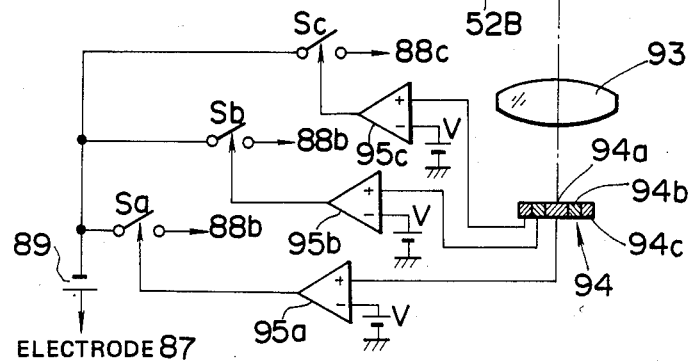

WELDING MONITORING APPARATUS

BACKGROUND OF THE INVENTION

Field of the Invention and Related Art Statement

This invention relates to a welding monitoring apparatus provided with a light attenuating means for dimming a part of an observed image in at least a part of an image guide.

Generally, the arc welding is extensively used in welding. However, such intensive arc light is emitted in the arc welding that it is necessary to protect the eyes of the worker. Therefore, for example, in the publication of Japanese Patent Publication No. 11755/1982, there is disclosed a prior art example wherein a non-uniform transmissivity type flter with which the transmissivity of the light in the central part becomes smaller is provided in front of an imaging tube of a monitoring television camera.

In the above mentioned prior art example, an incident light from an arc light part of a high luminance can be intercepted by the filter but, as the filter is arranged in front of the image forming plane of the image forming optical system, the light will be attenuated not only in the high luminance part but also in the peripheral low liminance part. Therefore, it is not sufficient as a welding monitoring apparatus and has a disadvantage that, while welding, the visual field will become dark and the periphery will not be seen.

In another prior art example disclosed in Japanese Patent Laid Open No. 142528/1983, a partly shielded fiter is movably provided but there is substantially the same defect as in the first prior art example.

Further, in the publication of Japanese Patent Laid Open No. 202189/1982, there is disclosed a prior art example wherein a light attenuating filter is fitted removably from the incident light by rotation.

In this prior art example, when not welding, the above mentioned disadvantage will be able to be dissolved but, while welding, the light incident from the peripheral side of a low luminance will be also attenuated, therefore, the same as in the above described prior art example, the peripheral side will become so dark as to make the observation or discretion difficult.

Also, in U.S. Pat. No. 4,225,771 and DE No. 3339182C1, there is a prior art example wherein a filter is arranged on the front surface side of a television camera to exclude the influence of the arc light in the observation.

In these prior art examples, there is a defect that, as a monochromatic picture image is obtained, the discretion is difficult.

OBJECTS AND SUMMARY OF THE INVENTION

An object of the present invention is to provide a welding monitoring apparatus with which the light only in a high luminance part can be attenuated.

Another object of the present invention is to provide a welding monitoring apparatus with which the light only in a high luminance part can be attenuated with a simple structure.

A further object of the present invention is to provide a welding monitoring apparatus with which the observation can be made in colors.

According to the present invention, a light attenuating means for dimming a part of an image is provided on at least one end surface of an image guide for transmitting an optical image formed by an objective so that a high luminance part may be dimmed and a color observation may be possible.

BRIEF DESCRIPTION OF THE DRAWINGS

FIGS. 1 to 4 relate to the first embodiment of the present invention.

FIG. 1 is a schematic formation view showing the formation of the first embodiment.

FIG. 2a is a magnified sectioned view on line A—A' in FIG. 1.

FIG. 2b is an explanatory diagram showing the distribution of the transmissivity for FIG. 2a.

FIG. 3 is a perspective view showing the appearance of the first embodiment.

FIG. 4a is an explanatory diagram showing the distribution of the luminance of an image formed in arc welding.

FIG. 4b is a characteristic diagram showing the distribution of the transmissivity in the first embodiment.

FIG. 4c is an explanatory diagram showing the contrast of a visual field image obtained by setting a high luminance part in the center of the visual field.

FIG. 5a is a sectioned view of an image guide part in the second embodiment of the present invention.

FIG. 5b is an explanatory diagram showing the distribution of the transmissivity corresponding to FIG. 5a.

FIG. 5c is an explanatory diagram showing the contrast of an image in case a high luminance part is set in the center of the visual field.

FIG. 8 is a formation view showing the fifth embodiment of the present invention.

FIG. 9 is a formation view showing a part of the sixth embodiment of the present invention.

FIG. 10 is a formation view showing a part of the seventh embodiment of the present invention.

FIG. 11a is an explanatory view showing an image guide part as seen from the eyepiece side.

FIG. 11b is an explanatory view showing the distribution of the transmissivity.

FIG. 12 is a formation view showing the eighth embodiment of the present invention.

FIG. 13 is a formation view showing a part of the ninth embodiment of the present invention.

FIG. 14 is a perspective view showing an electrochromic device in the ninth embodiment.

FIG. 15 is a formation view showing a part of the tenth embodiment of the present invention.

DETAILED DESCRIPTION OF PREFERRED EMBODIMENTS

Figure 3:
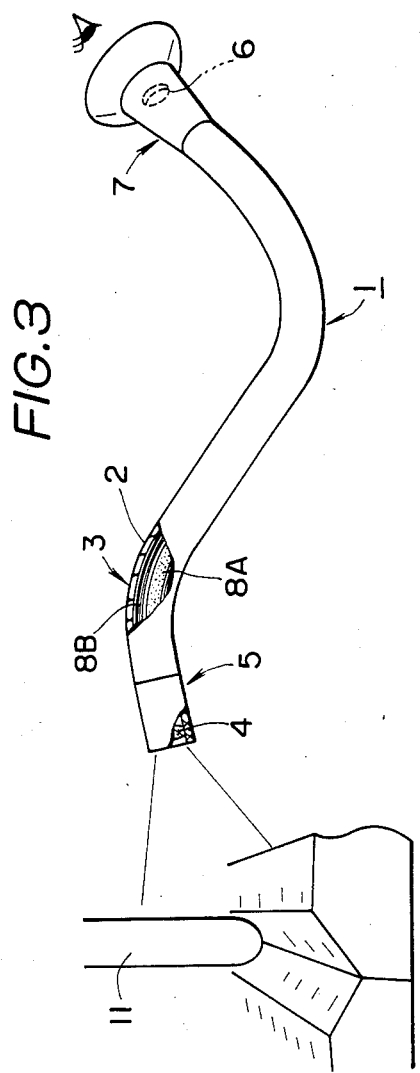

As shown in FIG. 3, a welding monitoring apparatus 1 of the first embodiment is formed of an image guide part 3 as an image transmitting means coated with a flexible tube 2, a tip part 5 containing an objective 4 forming the image of an object on one end surface of this image guide part 3 and an eyepiece part 7 containing an eyepiece 6 for magnifying and observing the image transmitted through the above mentioned image guide part 3.

The above mentioned image guide part 3 is formed of an optical fiber bundle made by bundling many very fine optical fibers and has a function of transmitting the image formed on one end surface (that is, the front end surface) to the other end surface (that is, the eyepiece side end surface).

By the way, the front end surface of this image guide part 3 is set in the focal plance of the objective 4 so that an object in front of this objective may be clearly imaged on the front end surface of the image guide part 3 by the objective 4. Now, the first embodiment is characterized in that, as shown in FIGS. 1 and 2, the above mentioned optical fiber bundle is formed of a low transmissivity optical fiber bundle 8A in the central circular cross-sectioned part and of a high transmissivity optical fiber bundle 8B in the peripheral ring-shaped part.

Therefore, in welding, when the tip part 5 is set so that an electrode 11 emitting arc flashes may be positioned on the tip side in the central part of the observed visual field as shown in FIG. 3, the high luminance flashing part will be dimmed so that the eyes of the worker may be protected and the peripheral low luminance part will be prevented from being dimmed so that the observation may be made. That is to say, as shown in FIG. 4a, the luminance of the flash in welding will be so high as to be ridge-shaped near the central part RO of the tip of the electrode 11. Therefore, if this part is set in the central part of the welding monitoring apparatus 1 as shown in FIG. 4b, as the luminance of the peak part is reduced in the low transmissivity part, in the observed image on the eyepiece side, the contrast distribution will be as in FIG. 4c, the image of the flash part will be dimmed to a proper brightness and the eyes of the worker can be protected.

Also, in welding in the prior art example, the disadvantage that the flashing part can be dimmed but the periphery becomes too dark can be prevented. Further, in the case of not welding, the observation can be made by using the peripheral part. Further, this first embodiment can be realized with a simple formation.

The ultraviolet rays included in the arc light can be attenuated by the optical fibers forming the image guide part 3 and therefore have no bad influence on the worker seeking through the eyepiece 6. The image can be seen with the visible light and is easier to distinguish than a monochromatic picture image.

FIG. 5 shows a sectioned view of an optical fiber bundle in the second embodiment of the present invention.

In this second embodiment, the optical fiber bundle forming the image guide has, as shown in FIG. 5a, the central circular part formed of a low transmissivity optical fiber bundle 21A, the concentric ring around the central circular part formed of a medium transmissivity optical fiber bundle 21B and further the concentric ring on the outer periphery of the above mentioned concentric ring formed of a high transmissivity optical fiber bundle 21C and shows such transmissvity distribution as is shown in FIG. 5b.

Therefore, the luminance distribution at the time of flashing becomes as in FIG. 5c and therefore the flashing part as of the optical image as seen from the eyepiece side can be dimmed and can be set at a contrast easier to observe.

By the way, in the above mentioned respective embodiments, the transmissivity distribution is rotary symmetrical with respect to the center part but the present invention is not limited to it. The transmissivity distribution can be other than rotary symmetrical as in the third embodiment in FIG. 6 or the fourth embodiment in FIG. 7.

Figure 6:
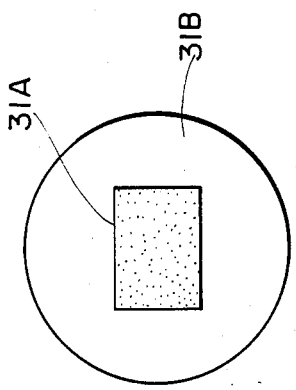
FIG. 6 is an explanatory view showing the shape of an optical fiber bundle different in the transmissivity in the third embodiment of the present invention.

In the third embodiment shown in FIG. 6, a rectangular low transmissivity optical fiber bundle 31A is provided in the central part and the part around it is formed of a high transmissivity optical fiber bundle 31B.

Figure 7:
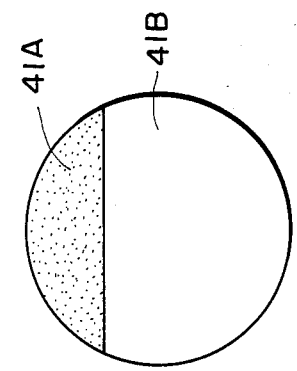
FIG. 7 is an explanatory view showing the shape of an optical fiber bundle different in the transmissivity in the fourth embodiment of the present invention.

In the fourth embodiment shown in FIG. 7, a part (on the upper side) somewhat smaller than half the circular cross-section of an optical fiber bundle is formed of a low transmissivity fiber bundle 41A and the rest of the cross-section is formed of a high transmissivity optical fiber bundle 41B.

FIG. 8 shows the fifth embodiment of the present invention.

The contour of a welding monitoring apparatus in the fifth embodiment is the same as is shown in FIG. 3. Therefore, the same members shall be respectively represented by the same reference numerals.

In this fifth embodiment, a high transmissivity (ordinary) optical fiber bundle 52 is used for the optical fiber bundle forming the image guide part 3. A disc-shaped light attenuating filter 53 is fitted to the center part of the end surface 52A opposed to the objective 4 of this optical fiber bundle 52 and located in the position to be of the focal plane of the objective.

The transmissivity as seen from the eyepiece part 7 with the above mentioned light attenuating member 53 is the same as is shown in FIG. 4b.

Therefore, the same as in the above described case, in welding, if the center part of the visual field is set to be a high luminance part of welding, the same function and effect as in the case of the first embodiment will be able to be obtained.

FIG. 9 shows the sixth embodiment of the present invention. In this sixth embodiment, a light attenuating filter 54 is attached by pasting or the like to the central part of the eyepiece side end surface 52B of the optical fiber bundle 52.

The functions and effects of this sixth embodiment are substantially the same as of the above mentioned fifth embodiment.

FIG. 10 shows the seventh embodiment of the present invention.

In a welding monitoring apparatus 61 of this seventh embodiment, light attenuating filters 62 and 63 are secured respectively to the objective side end surface 52A and eyepiece side end surface 52B of the optical fiber bundle and are respectively disc-shaped. For example, one light attenuating filter 62 is smaller than the other light attenuating filter 63. The transmissivity distribution in the image guide part 3 (FIG. 11a) in case the optical image transmitted by using both light attenuating filters 62 and 63 is seen from the eyepiece 6 side is as shown in FIG. 11b.

That is to say, the transmissivity of the part in which both light attenuating filters 62 and 63 overlap is considerably small. The transmissivity of the part of one light attenuating filter 63 on the periphery is a little reduced by the light attenuating filter 63 and the light is not substantially attenuated on the further periphery. Therefore, the function is substantially the same as in the case shown in FIG. 5. In this case, the function can be realized by providing the light attenuating filters 62 and 63 for the single transmissivity optical bundle 52.

FIG. 12 shows the eighth embodiment of the present invention.

In a welding monitoring apparatus 71 in this eighth embodiment, light attenuating members 72 and 73 are provided movably in the direction indicated by the arrow B on both end surfaces 52A and 52B of the optical fiber bundle 52.

The light attenuating member 72 (or 73) is formed of a light attenuating filter 72a (or 73a) and a light transmitting member 72b (or 73b) on its periphery.

According to this eighth embodiment, the light attenuating parts are movable and therefore are more effective to welding.

By the way, in the above mentioned eighth embodiment, only one light attenuating member (for example, 73) can be made movable.

By the way, the light attenuating means may be provided near the image forming plane.

FIG. 13 shows the ninth embodiment of the present invention.

In a welding monitoring apparatus 81 of this embodiment, a light attenuating member which can vary the transmitted light amount with an electrochromic device 82 is provided, for example, on the eyepiece side end surface 52B. As shown in FIG. 14, this electrochromic device 82 is so formed that such electrolyte 85 as film-shaped lithium may be in contact with an electrochromic film 86 within a sealed shell formed of such transparent plates 83 as glass plates through a spacer 84. Such electrolyte 85 and electrochromic film 86 are held between transparent electrodes 87 and 88.

The above mentioned one transparent electrode 87 is an entire surface electrode and the other transparent electrode 88 is formed of ring-shaped concentrically sectioned transparent electrodes 88a, 88b, 88c and 88d (but the innermost section 88a is circular). The voltage of a battery 89 can be impressed by switches Sa, Sb, Sc and Sd onto the transparent electrode 87 surface common with these transparent electrodes 88a, 88c and 88d.

The above mentioned electrochromic film 86 is formed of such electrochromic material as amorphous $WO_3$. By the way, the electrolyte 85 is used to color the amorphous $WO_3$ or the like. When the voltage in the direction in which the electrolyte side is positive is impressed, the colored thickness will be substantially proportional to the electricity amount flowing through the unit area and the transmitted light amount will become smaller. Therefore, in welding, if, for example, the central side switch 83a is switched on to reduce the transmitted light amount of only the central part, the flashing part in welding will be able to be dimmed. In the central region in which the transmitted light amount has been made smaller by this switch 88a, in case the area is short, the outer peripheral side switch 88a may be further switched on. That is to say, the transmitted light amount can be controlled in response to the size of the flashing part. Therefore, it is convenient. In the case of no welding, if the respective switches 88i (i=a, b, c and d) are kept off, the central part will be able to be observed without attenuating the light.

By the way, if the number of the above mentioned concentric ring-shaped electrodes 88a, 88b, 88c and 88d is increased, the light will be able to be more finely controlled.

FIG. 15 shows the tenth embodiment of the present invention.

In a welding monitoring apparatus 91 of this tenth embodiment, the switches 88a, 88b and 88c (88d is omitted for brevity) of the electrochromic device 82 of the above mentioned ninth embodiment are automatically controlled to be on and off.

That is to say, a beam splitter 92 is arranged between the electrochromic device 82 and eyepiece 6 so that a part (for example, several %) of the light amount may be reflected downward by this beam splitter 92. This reflected light is imaged in a photosensor 94 by a light collecting lens 93. This photosensor 94 consists, for example, of ring-shaped concentrically sectioned elements 94a, 94b and 94c (the central one is circular) and the outputs of the respective elements are put into comparators 95a, 95b and 95c. A reference voltage V is impressed onto the other input ends of the respective comparators 95a, 95b and 95c. The respective compared outputs are impressed onto the switch controlling ends of analogue switches Sa, Sb and Sc to be switched on when a high level is reached.

According to this tenth embodiment, if there is such high luminance part as a flashing part, the luminance part will color the electrochromic film of the electrode part of the imaged part so as to be able to attenuate the light.

Therefore, it is not necessary for the worker to selectively switch on or off the switch every time. Therefore, it is convenient.

By the way, in the above mentioned tenth embodiment, the level of the transmitted light amount is adjusted only by one bit but the impressed voltage level can be varied to vary the colored (transmitted light amount) level.

Also, in the above mentioned ninth and tenth embodiments, the electrochromic device is used but a liquid crystal may be used.

By the way, for example, the above mentioned ninth and tenth embodiments may be removably fitted in the structure.

By the way, the present invention can be applied not only to the case of monitoring the welding but also to the case that the contrast of the visual field is too large.

What is claimed is:

1. A welding monitoring apparatus for monitoring a welding state or the like luminous at a high luminance comprising:
   an objective forming the image of an object position;
   an image guide formed of an optical fiber bundle arranged on one end surface in the focal plane of said objective and transmitting an optical image to the other end surface;
   an eyepiece for magnifying and observing the optical image transmitted by said image guide; and
   a light attenuating means provided near at least one end surface of said image guide and dimming a part of the image.

2. A welding monitoring apparatus according to claim 1 wherein said light attenuating means is formed by sectioning the entire optical fiber bundle forming said image guide into a plurality of optical fiber bundle groups with each group having a different transmissivity.

3. A welding monitoring apparatus according to claim 2 wherein said plurality of optical fiber bundle groups having different transmissivities are so made that an optical fiber bundle arranged at the center part has the lowest transmissivity.

4. A welding monitoring apparatus according to claim 2 wherein said plurality of optical fiber bundle groups having different transmissivities are arranged in the form of concentric rings.

5. A welding monitoring apparatus according to claim 2 wherein the optical fiber bundle group of the lowest transmissivity among said plurality of optical fiber bundle groups of different transmissivities is arranged in non-rotary symmetry with respect to the center axis.

6. A welding monitoring apparatus according to claim 1 wherein said light attenuating means is a light attenuating filter having a transmissivity less than 100% and said light attenuating filter is fitted to at least one end surface of said image guide to cover a part of said one end surface.

7. A welding monitoring apparatus according to claim 6 wherein said light attenuating filter is mounted for movement in parallel with said end surface.

8. A welding monitoring apparatus according to claim 6 wherein said light attenuating filter is disc-shaped.

9. A welding monitoring apparatus according to claim 8 wherein said light attenuating filter is formed of a plurality of filters having different transmissivities.

10. A welding monitoring apparatus according to claim 6 wherein said light attenuating filter is fitted to each end surface of said image guide.

11. A welding monitoring apparatus according to claim 6 wherein said light attenuating means is fitted to the eyepiece side of said image guide.

12. A welding monitoring apparatus according to claim 11 wherein said light attenuating means is formed of a transmissivity varying member varying the transmissivity when a voltage is impressed.

13. A welding monitoring apparatus according to claim 12 wherein said transmissivity varying member is formed of an electrochromic device.

14. A welding monitoring apparatus according to claim 12 wherein said transmissivity varying member is formed of a liquid crystal.

15. A welding monitoring apparatus according to claim 13 or 14 wherein said transmissivity varying member is formed of a plurality of regions and includes an electrical circuit which can electrically vary the transmissivity.

16. A welding monitoring apparatus according to claim 15 wherein said plurality of regions are formed to be concentric ring-shaped.

17. A welding monitoring apparatus according to claim 15 wherein said transmissivity varying member includes a switch for controlling at least one of said plurality of regions.

18. A welding monitoring apparatus according to claim 17 wherein said switch is manually operable.

19. A welding monitoring apparatus according to claim 17 further including means for detecting the luminance passing through said transmissivity varying member and said switch is controlled with the output of said means for detecting the luminance passing through said transmissivity varying member.

20. A welding monitoring apparatus according to claim 19 wherein said light amount detecting means comprises:
   a beam splitting means branching a part of the light having passed through said transmissivity varying member;
   a photosensor receiving the light branched by said beam splitting means; and
   a light amount level comparing means comparing the photoelectric converted output of said photosensor with a reference level and switching on said switch in case said output is above the reference level.

21. A welding monitoring apparatus according to claim 20 wherein said photosensor consists of as many photosensor devices as the plurality of sections of said transmissivity varying member and can dim the luminance part above the reference level in the optical image incident on the eyepiece side through said beam splitting means.

* * * * *